April 21, 1970          R. C. ROPP          3,507,804
METHOD OF COPRECIPITATING MIXED RARE-EARTH ORTHOPHOSPHATES
SUITABLE FOR MAKING PHOSPHOR
Original Filed April 25, 1967
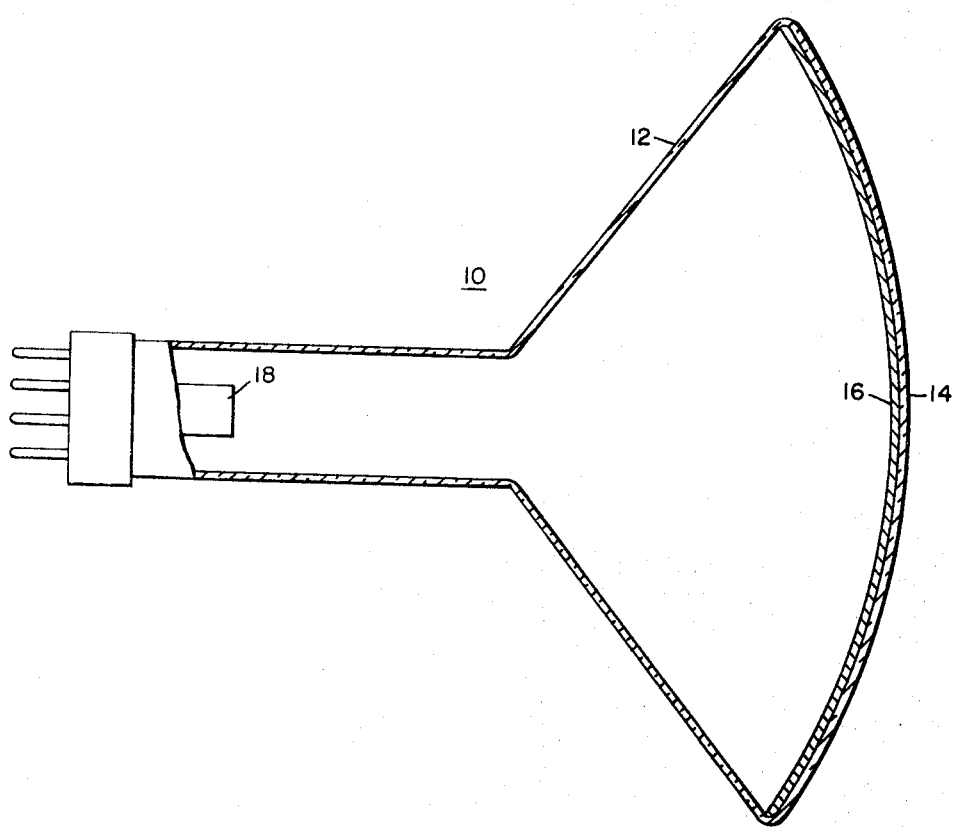
WITNESSES:
Bernard R. Giguay
Walter Sutcliff
INVENTOR
Richard C. Ropp
BY
W. D. Palmer
ATTORNEY

United States Patent Office 3,507,804
Patented Apr. 21, 1970

3,507,804
METHOD OF COPRECIPITATING MIXED RARE-EARTH ORTHOPHOSPHATES SUITABLE FOR MAKING PHOSPHOR
Richard C. Ropp, North Caldwell, N.J., assignor to Westinghouse Electric Corporation, Pittsburgh, Pa., a corporation of Pennsylvania
Continuation of application Ser. No. 633,426, Apr. 25, 1967. This application June 13, 1968, Ser. No. 736,839
Int. Cl. C09k 1/36
U.S. Cl. 252—301.4                  11 Claims

ABSTRACT OF THE DISCLOSURE

Method of precipitation of raw mix which is used to prepare improved rare-earth metal activated, rare-earth metal orthophosphates. The crystallinity and particle size of the rare-earth metal orthophosphate precipitate is determined by the concentration of rare-earth metal in a first solution and the concentration of an orthophosphoric acid second solution. The first solution is slowly added to the second solution while it is maintained acid. The efficiency of the precipitation can be maximized by controlling the concentration of the orthophosphoric acid solution.

BACKGROUND OF THE INVENTION

This application is a continuation of U.S. application Ser. No. 633,426, filed Apr. 25, 1967, now abandoned, and owned by the present assignee.

Rare-earth metal phosphates are well known in the prior art. An yttrium phosphate phosphor activated by cerium is taught by Struck Patent No. 3,104,226 dated Sept. 17, 1963. The Dutch patent application No. 6,514,050 dated Feb. 2, 1966 teaches that the particle size of yttrium-europium orthovanadate phosphor is dependent on the raw mix ratio of vanadium pentoxide to rare-earth metal at a particular firing temperature.

The rare-earth phosphate phosphors find diverse uses ranging from color television picture tube application to fast decay phosphors for scanning device screens. The particular rare-earth elements and the matrix to activator ratio used determines the particular desired spectral characteristics.

The measurement of transient electrical signals requires cathode-ray devices that employ a screen phosphor that has a decay-time of very short duration. Decay-time is the time for brightness to decay to 37% of its original value after excitation ceases. Some of the known fast-decay phosphors cannot be used practically since their emission is in the shorter ultraviolet and is largely absorbed by the glass envelope of the cathode-ray tube. The fast-decay phosphor which is prepared as described in the aforementioned Struck patent emits at 3400 A.U. which is substantially absorbed by some glass. Some fast-decay phosphors also undergo a severe loss of brightness within a short operational period.

The average particle size of a phosphor is important to all applications but especially for cathode-ray display screens where clarity and discrimination are important. The milling required to achieve the desired particle size after standard solid state firing is known to impair the brightness of the phosphor.

Prior art production of rare-earth metal orthophosphate directly by firing has often resulted in undesired formation of some complex pyrophosphates and metaphosphates during firing due to uneven mixing of phosphate in the raw mix. Precipitation techniques previously employed in producing rare-earth orthophosphates can result in amorphous gelatinous precipitates that upon firing may produce inferior luminescent materials.

SUMMARY

It is an object of this invention to provide a method for precipitating stoichiometric, crystalline rare-earth metal orthophosphate which can be used as a raw mix material to produce an improved rare-earth metal activated, rare-earth metal orthophosphate or other compositions or mixtures having such an orthophosphate constituent.

It is another object of this invention to provide a method whereby rare-earth metal orthophosphate of predetermined particle size is produced.

It is yet another object of the invention to maximize the yield of precipitated rare-earth metal orthophosphate to allow for efficiency of production.

It is a further object of the invention to prepare a rare-earth metal orthophosphate phosphor which when excited by cathode rays efficiently emits radiation at about 3670 A., and which radiation has a superior fast decay characteristic.

It is still another object of the invention to provide a cathode ray tube combination utilizing a fast-decay phosphor which when excited by cathode rays emits radiation at about 3670 A. which radiation is substantially transmitted through the glass faceplate of the tube.

These objects and other, which will become apparent as the description proceeds, are accomplished by the stoichiometric precipitation of mixed rare-earth metal orthophosphate, with the rare-earth metals being in predetermined proportions. An aqueous first solution containing rare-earth metal matrix constituent and rare-earth metal activator constituent in a concentration of from 0.1 to 6 gram-atoms of rare-earth metal per liter is slowly added to a second solution of orthophosphoric acid. The resulting mixture is maintained at least at 40° C. to precipitate the rare-earth metal orthophosphate. The concentration of the orthophosphoric acid solution can be varied in effecting the precipitation so that the ratio of total gram-atoms per liter of metallic constituents in the first solution to gram-moles per liter of orthophosphoric acid in the second solution is from about 1/1 to 1/9. In order to maximize the amount of rare-earth metal phosphate precipitated the concentration of the orthophosphoric acid is preferably from 1 to 4 molar. The temperature of the mixture is preferred at about 80° C. to maximize the precipitation yield.

This method of rare-earth metal orthophosphate preparation provides a raw material which when fired produces a superior phosphor. The phosphor containing predetermined amounts of yttrium, lanthanum, gadolinium, and cerium exhibits superior short decay characteristic when excited by cathode rays, and the emission of the phosphor is substantially concentrated at about 3670 A., which radiation is readily passed through a conventional glass faceplate of a cathode ray tube.

BRIEF DESCRIPTION OF THE DRAWING

The sole figure illustrates an otherwise conventional cathode ray tube which includes a screen comprising the phosphor prepared according to the present invention.

DESCRIPTION OF THE PREFERRED EMBODIMENTS

Example I

As a first example, weigh out 45.2 grams $Y_2O_3$, 72.4 grams $Gd_2O_3$, and 65.16 grams $La_2O_3$ respectively. Each of these indicated rare-earth metal oxides are dissolved separately in 90 ml. concentrated nitric acid, heating as necessary, and the resulting solutions are each, diluted to 1,000 ml. total volume. Each of the foregoing solutions will have a molar concentration of 0.4 and the molar concentration of these solutions can be readily varied as desired. 434.25 grams $Ce(NO_3)_3 \cdot 6H_2O$ is dissolved in water and diluted to a total volume of 1,000 ml. One millimeter of this cerium nitrate solution is equivalent to 1 millimole. A 3.20 molar solution of orthophosphoric acid is prepared by adding 218.6 milliliters of 85% reagent grade orthophosphoric acid to 500 milliliters distilled water and the resulting solution is diluted to a total volume of 1 liter.

To make a raw mix suitable for prepearing a cerium-activated yttrium-lanthanum-gadolinium orthophosphate, 900 milliliters of the foregoing yttrium nitrate solution, 50 milliliters of the foregoing lanthanum nitrate solution and 50 milliliters of the foregoing gadolinium nitrate solution are mixed with 25 milliliters of the foregoing cerium nitrate solution to form a first solution used in preparing the phosphor raw mix. The foregoing orthophosphoric acid solution constitutes a second solution which is used in preparing the raw mix and one liter of the foregoing orthophosphoric acid solution is heated to 80° C. The mixed rare-earth metal nitrate solution is also heated to 80° C. and slowly added to the orthphosphoric acid solution at a rate of 20 milliliters per minute. The rate of addition is not critical although a relatively slower rate of addition is preferable for rare-earth metal solutions of higher gram-atom per liter content. About three minutes after the mixing begins, a slight turbidity begins to appear and rapidly becomes more dense. After all of the mixed rare-earth metal nitrate solution has been added to the orthophosphoric acid solution, the precipitate, which is now crystalline and heavy, is allowed to settle. The supernatant liquid is decanted and the precipitate is washed and then dried.

Preferably the dried precipitate is milled in distilled water for about 45 minutes, the resulting powder filtered and dried, and then fired in a covered silica crucible for three hours in air atmosphere at a temperature of 1200° C. The resulting phosphor is a cerium-activated yttrium-lanthanum-gadolinium orthophosphate wherein the rare-earth metals which comprise the matrix of the phosphor are in the same relative gram-atom ratios as were present in the solution, namely, 0.90:0.05:0.05. The phosphor is ultraviolet emitting and had very fast decay properties. In Example I the ratio of rare-earth metal constitutents can be varied. In preparing an orthophosphate suitable as the raw mix for producing a fast decay phosphor the gram-atom of yttrium to total gram-atoms of rare-earth metals present in the first solution can be varied from 0.47 to 0.98, the gram-atom ratio of gadolinium to the total gram-atoms of rare-earth metals present in the first solution can be from 0 to 0.2, the gram-atom ratio of lanthanum to the total gram-atoms of rare-earth metals present in the first solution can be from 0 to 0.25; and the gram-atom ratio of cerium to the total gram-atoms of rare-earth metals present in the first solution can be from 0.02 to 0.08.

The phosphor prepared above is readily incorporated into the cathode ray tube combination shown in the sole figure. The cathode ray tube 10 comprises the hermetically sealed envelope 12, typically glass, the glass faceplate 14 which has a thin layer of phosphor forming a screen 16 disposed on the surface within tube 10. The screen 16 comprises the rare-earth metal orthophosphate phosphor prepared by the foregoing method. The cathode ray emitter 18 is operatively disposed from the screen and directs cathode ray emission onto the screen. This combination is a significant advance because the phosphor emits short-decay characteristic emission substantially at about 3670 A., which is substantially transmitted by the glass faceplate, thus making the phosphor composition readily usable in standard cathode-ray tubes.

It is belived that the preparation by precipitation of the rare-earth metal orthophosphate according to the present method allows for exact stoichiometry and site symmetry of constituents and that this is what accounts for the emission being substantially at about 3670 A.

EXAMPLE II

To prepare a cerium-activated, yttrium orthophosphate phosphor, one liter of the previously described 0.4 M yttrium nitrate solution and 25 ml. of the previously described 1 M cerium nitrate solution are mixed and added to one liter of the previously described 3.20 M orthophosphoric acid solution in the same manner as previously specified. The resulting raw mix is then processed similarly to the previous example and fired in a manner similar to the previous example in order to produce a phosphor which as very fast decay properties, more specifically, a decay time of about 40 nanoseconds. The gram-atom ratio of yttrium to cerium in the first solution of this example is 4:0.25. This ratio can be varied but in preparing an orthophosphate suitable as the raw mix for producing a fast-decay phophor this ratio should be from 92.8 to 98.2. The phosphors produced from the raw mix as described in Examples I and II emit ultraviolet light primarily in the region of 3670 A.U. when excited by a cathode-ray source. This ultraviolet emission is substantially transmitted thtrough the glass faceplate portion of the envelope of a cathode ray tube.

The yttrium-cerium orthophosphate prepared as specified above can be added to a mixture of vanadium pentoxide and yttrium-europium oxalate and fired to produce an yttrium-vanadate-phosphate composition.

Similarly if the cerium is replaced by europium in this example, the yttrium-europium orthophosphate prepared by the method of the present invention can be added to a mixture of yttrium-europium oxalate and arsenic pentoxide and fired to produce an yttrium-arsenate-phosphate composition.

Example III

To prepare a terbium-activated, lanthanum orthophosphate, terbium oxide is dissolved in nitric acid and the resulting solution is diluted to a concentration of 0.4 molar. A mixture of 700 ml. of the 0.4 M lanthanum nitrate solution as was specified under Example I and 300 ml. of the foregoing terbium nitrate solution is used, in order to prepare a first rare-earth metal nitrate solution which is used in preparing the improved raw mix. This first solution of mixed rare-earth metal nitrates is added to a second aqueous solution of orthophosphoric acid having a concentration of 1.6 molar. The temperatures of the solutions and the rate of mixing is as was specified under Example I. The resulting precipitate is dried and then milled and fired for four hours at a temperature of 1150° C. in air in a covered silica crucible. The resulting phosphor is green emitting when excited by cathode rays and it is also excitable by ultraviolet radiation. A similar green emitting phosphor can be prepared by substituting a yttrium nitrate solution for the lanthanum nitrate solution in the proportions indicated in this example.

The terbium activated lanthanum orthophosphate phosphor which is produced from the raw mix described in this example is particularly excitable by 2537 A.U. ultraviolet radiation. The terbium activated yttrium orthophosphate which is similarly prepared is particularly excitable by 2630 A.U. ultraviolet radiation.

The particle size of the phosphor which is prepared from the raw mixes can be controlled by varying the relative concentrations of the rare-earth nitrate solutions and the orthophosphoric acid solutions. As an example, the particle size of the coprecipitated orthophosphates which constitute the phosphor raw mix can be readily controlled and varied and the particle size of the phosphor which is produced from the raw mix controlled accordingly. This of course is very important depending upon the application intended for the phosphor. To illustrate the control of the particle size, the yttrium nitrate solution as specified under Example II was added to orthophosphoric acid solutions in the manner as specified, but wherein the molar concentration of orthophosphoric acid in this second solution was varied. When a 0.4 molar yttrium nitrate solution was added to a 0.4 molar orthophosphoric acid solution, the precipitate had an average particle size of about 18 microns as did the final phosphor. When the 0.4 molar yttrium nitrate solution was added to a 1.6 molar orthophosphoric acid solution, the particle size of the precipitate increased to about 31 microns and the particle size of the phosphor prepared from this raw mix was about 36 microns. When the 0.4 molar yttrium nitrate solution was added to a 2.4 molar orthophosphoric acid solution, the resulting precipitate had an average particle size of about 45.4 microns and the prepared phosphor had an average particle size of about 45 microns. This orthophosphate when fired exhibits emission characteristics comparable to the phosphor which was prepared in accordance with Example II.

With respect to the terbium-activated, lanthanum orthophosphate as specified under Example III, however, an opposite effect is noted and the higher the relative concentration of the orthophosphoric acid solution to which the lanthanum nitrate is added, the smaller the particle size of the phosphor which is prepared from the resulting raw mix.

It has been observed that greatest yield of rare-earth metal orthophoshate occurs under these conditions, i.e., the rare-earth metal concentration is 0.4 molar, the orthophosphoric acid solution concentration is 2.4 molar, and the precipitation temperature is about 80° C. Typically, when the rare-earth metal concentration is about 0.4 molar and the phosphoric acid concentration in solution is 2.4 molar the precipitated yield is such that about 83% of the total rare-earth metal in the mixture is precipitated as rare-earth metal phosphate. In maximizing the precipitation yield the orthophosphoric acid solution concentration is the most important factor, and this value is preferably from 1 to 4 molar with the best yield at about 2.4 moles/liter. Of course the rare-earth metal remaining in the solution after the orthophosphate has been separated can be recovered conveniently as rare-earth metal oxalate by adding sufficient amounts of oxalating compound such as oxalic acid. This rare-earth metal oxalate is very useful as a raw mix constituent for preparing phosphors such as rare-earth metal vanadate. The rare-earth metal concentration can be varied while optimizing the precipitation yield and is preferred to range from 0.11 to 4 gram-atoms per liter.

Example IV

The yttrium nitrate, lanthanum nitrate and gadolinium nitrate solutions as specified under Example I are mixed in the relative volume ratios of 0.60:0.05:0.05, and to this is added the terbium nitrate solution as specified under Example III in the relative volume ratio of 0.30. As an example, 600 milliliters of the yttrium nitrate solution are mixed with 50 milliliters of the lanthanum nitrate solution, 50 milliliters of the gadolinium nitrate solution, and 300 milliliters of the terbium nitrate solution. One liter of a 3.2 molar solution of orthophosphoric acid as used in the previous examples is heated to 80° C. and the mixed rare-earth nitrate solution is also heated to 80° C. and added to the phosphoric acid solution at a rate of 20 milliliters per minute. The precipitate is separated in accordance with the procedure as specified under Example I, filtered, dried and fired in a covered silica crucible for three hours at 1200° C. in air. The resulting phosphor has a green emission under excitation by cathode rays and is suitable for use in color television tubes.

In the practice of Examples III and IV the ratio of rare-earth metal constituents can be varied in precipitating the orthophosphate but when this is to be used as the raw mix for a superior green emitting phosphor, the terbium activated concentration should comprise at least 16 percent of the total gram-atoms of the rare-earth metallic constituents in the mixed rare-earth metal nitrate solution.

Example V

One gram molecular weight of erbium oxide and 0.025 gram molecular weight of thulium oxide are dissolved in about 450 ml. of concentrated nitric acid and the resulting solution diluted to a total volume of two liters. There is also prepared two liters of a 4.0 molar solution of orthophosphoric acid. The mixed rare-earth, nitrate solution is then added to the foregoing orthophosphoric acid solution at a rate of 20 milliliters per minute with moderate stirring and with the solutions at a temperature of 80° C. The precipitate is recovered as specified under Example I and the dried precipitate fired in a covered silica crucible in air at 1200° C. for about three hours. The resulting phosphor is useful for producing laser crystals. Other rare-earth metals can be substituted for the thulium, such as tytterbium, praseodymium, or neodymium.

Example VI

One mole of neodymium oxide and 0.025 mole of praseodymium oxide are dissolved in approximately 450 ml. of concentrated nitric acid and the resulting solution is diluted to a total volume of two liters. A 4.0 molar solution of orthophosphoric acid in amount of two liters is also prepared. The mixed rare-earth metal nitrate solution is added to the orthophosphoric acid solution at a rate of 20 milliliters per minute with the solutions heated to a temperature of about 80° C. to precipitate the mixed orthophosphates. After separation in accordance with the Example I, the raw mix is fired in an air atmosphere in a covered silica crucible at a temperature of about 1200° C. for about three hours. The resulting phosphor is suitable for use in producing laser crystals. Other rare-earths can be substituted for the praseodymium such as holmium, erbium, thulium, or ytterbium, in approximately the same molar proportions.

Example VII

One mole of holmium oxide and 0.025 mole of ytterbium oxide are dissolved in about 450 ml. of concentrated nitric acid and the resulting solution diluted to a total volume of two liters. There is also prepared a 4.0 molar solution of orthophosphoric acid in a total amount of two liters. The mixed rare-earth metal nitrate solution is slowly added at a rate of 20 ml. per minute to the orthophosphoric acid solution with the solutions at a temperature of 80° C. to precipitate the orthophosphate. After separation of the precipitate in accordance with the preceding examples, the dried precipitate is fired for three hours at 1200° C. in an air atmosphere. The resulting material is very suitable for the production of laser materials. Other rare-earths can be substituted for the ytterbium, such as neodymium, praseodymium, or erbium.

In all of the foregoing examples, the preferred temperature used in precipitating the rare-earth metal orthophosphate is about 80° C. The orthophosphates have a solubility that is inversely proportional to temperature, at least within the temperature ranges utilized here, i.e. from 40°–90° C. The precipitation can be carried out at a temperature as low as 40°, but the preferred precipitation temperature is from about 60° C. to 90° C. so that the formed rare-earth metal orthophosphates will be relatively insoluble in the liquid vehicle. If the temperature of the mixed solutions, during precipitation, is increased to appreciably more than about 90° C., there is a tendency to precipitate a gelatinous material, which when ultimately fired produces an inferior phosphor.

In practicing the present method, it is important that the rare-earth metal compounds be added to the orthophosphoric acid solution in order that the resulting mixture is acidic at all times. If the orthophosphate is added to the mixed rare-earth nitrate solutions, the resulting mixed orthophosphates upon firing produce an inferior phosphor.

In the foregoing examples, the concentration of the total rare-earth metal in solution was varied from 0.4 gram-atom per liter to 1 gram-atom per liter. It has been found that the concentration of rare-earth metal in the first solution can be varied from 0.1 gram-atom per liter to 6 gram-atoms per liter in order to produce a raw mix which can be fired to produce a superior phosphor material.

It is also important that the ratio of rare-earth metal ions in the first solution to the concentration of the phosphate radical in the second solution is controlled in order to achieve the desired coprecipitation when the two solutions are mixed. It has been found that in order to precipitate the phosphate the ratio of the total gram-atoms per liter of the rare-earth constituents in the first solution to the gram-atoms per liter of phosphate radical in the second solution should be from about 1/1 to about 1/9.

For preparing superior phosphors from the precipitated orthophosphates it has been observed that when the rare-earth metal concentration in the first solution is greater than one gram-atom per liter, the ratio of total rare-earth metal gram-atoms per liter to gram-moles of phosphate radical per liter is preferably from about 1/1 to 1/4.

It appears that the mechanism which permits the particle size to be accurately controlled is the degree of control which is possible over the ratio of rare-earth metal to phosphate radical in solution in coprecipitating the mixed rare-earth metal orthophosphates.

While numerous examples have been specified hereinbefore, it should be understood that the present method for producing the raw mix comprising the mixed rare-earth metal orthophosphates can be used for making any rare-earth metal activated, rare-earth metal orthophosphate. All of these indicated phosphors are similar to one another in that both the activator and the cationic constituents of the matrix can be coprecipitated in a very carefully controlled fashion.

It will be recognized that the objects of the invention have been achieved by providing a method for precipitating stoichiometric, crystalline, rare-earth metal orthophosphate which can be used as a raw mix material to produce an improved rare-earth metal activated, rare-earth metal orthophosphate phosphor as well as other compositions or mixtures having such an orthophosphate constituent. The particle size of the raw mix can be carefully controlled and thus the particle size of the resulting phosphor. The conditions under which optimum precipitation yield is achieved are also specified.

It should be recognized that while the specific examples given employed particular ratios of materials and particular procedures, the invention is not to be limited thereto or thereby.

I claim as my invention:

1. The method of producing raw-mix material for preparing rare-earth metal activated, rare-earth metal orthophosphate phosphor, of predetermined particle size, in order to improve the performance characteristics of the phosphor material produced therefrom, which method comprises:

(a) preparing a first aqueous solution of rare-earth metal compound, which solution contains as substantially the only metallic constituents the rare-earth metal comprising said phosphor matrix and the rare-earth metal comprising said phosphor activator, said metallic constituents present in said first solution in predetermined proportions as desired in said phosphor, and the concentration of the total of said metallic constituents in said first solution being from 0.1 to 6 gram-atoms per liter of solution; and preparing a second aqueous solution of orthophosphoric acid of predetermined concentration such that the ratio of total gram-atoms per liter of said metallic constituents in said first solution to the gram-moles per liter of orthophosphoric acid in said second solution is from about 1/1 to about 1/9; and (b) slowly adding said first solution to said second solution while maintaining the resulting mixture acidic and at least at 40° C. to precipitate said rare-earth metal as said orthophosphate.

earth metal as said orthophosphate.

2. The method as specified in claim 1, wherein said first and second solution are mixed at a temperature of from about 60° C. to 90° C.

3. The method specified in claim 1, wherein said precipitate is separated from the residual supernatant liquid and is thereafter fired at a predetermined temperature in a predetermined atmosphere and for a predetermined time to produce said orthophosphate phosphor.

4. The method specified in claim 1 wherein the resulting raw mix can be used to prepare phosphor material having superior fast decay characteristics, and wherein said first aqueous solution consists essentially of yttrium and cerium as said metallic constituents, and the gram-atom ratio of yttrium to cerium in said first solution being from 92:8 to 98:2.

5. The method specified in claim 1, wherein when the concentration of the total of said metallic constituents in said first solution is greater than one gram-atom per liter of solution, and said ratio of total gram-atoms per liter of said metallic constituents in said first solution to the gram-mole per liter of phosphate radical in said second solution is preferably from about 1/1 to 1/4.

6. The method as specified in claim 1, wherein the concentration of orthophosphoric acid is preferably from 1 to 4 moles of said acid per liter of said second aqueous solution, whereby the yield of rare-earth metal orthophosphate is optimized.

7. The method as specified in claim 1, wherein the concentration of orthophosphoric acid is preferably 2.4 moles of said acid per liter of said second aqueous solution, and said mixture is maintained at about 80° C. whereby the yield of rare-earth metal orthophosphate is optimized.

8. The method specified in claim 1, wherein the resulting raw-mix can be used to prepare phosphor material having superior fast decay characteristics, and wherein said first aqueous solution consists essentially of yttrium, lanthanum, gadolinium, and cerium as said metallic constituents, and the gram-atoms of yttrium comprise from 47 to 98 percent of the total gram-atoms of said metallic constituents in said first solution, the gram-atoms of lanthanum comprise from 0 to 25 percent of the total gram-atoms of said metallic constituents, the gram-atoms of gadolinium comprising from 0 to 20 percent of the total gram-atoms of said metallic constituent, and the gram-atoms of cerium comprising from 2 to 8 percent of the total gram-atoms of said metallic constituents.

9. The method of preparing rare-earth metal orthophosphate phosphor having superior fast decay characteristics, wherein the phosphor raw mix as specified in claim 8 is fired to form the phosphor.

10. The method as specified in claim 9, wherein said firing is in air for three hours at 1200° C.

11. A cerium activated rare-earth metal orthophosphate phosphor composition having superior fast decay characteristics, said phosphor composition having been prepared by the method as specified in claim 9.

References Cited

UNITED STATES PATENTS

| | | |
|---|---|---|
| 3,104,226 | 2/1963 | Struck. |
| 3,211,666 | 10/1965 | McAllister. |
| 3,250,722 | 5/1966 | Borchardt. |
| 3,322,681 | 5/1967 | Smith. |
| 3,422,024 | 1/1969 | McAllister. |

OTHER REFERENCES

Pascal: Nouveau Traité de Chimie Minerale, Tome VII, Deuxieme Fascicule, 1959, pp. 978–979.

TOBIAS E. LEVOW, Primary Examiner

R. D. EDMONDS, Assistant Examiner